United States Patent
Politis et al.

(10) Patent No.: US 9,640,986 B2
(45) Date of Patent: May 2, 2017

(54) CABLE BREAKOUT ASSEMBLY

(71) Applicant: Raycap Intellectual Property Ltd., Nicosia, Cyprus (GR)

(72) Inventors: Zafiris Politis, Athens (GR); Fani Asimakopoulou, Athens (GR); Kostas Bakatsias, Athens (GR); Charis Coletti, Athens (GR)

(73) Assignee: RAYCAP INTELLECTUAL PROPERTY LTD., Nicosia (CY)

(*) Notice: Subject to any disclaimer, the term of this patent is extended or adjusted under 35 U.S.C. 154(b) by 609 days.

(21) Appl. No.: 14/060,891

(22) Filed: Oct. 23, 2013

(65) Prior Publication Data
US 2015/0109710 A1    Apr. 23, 2015

(51) Int. Cl.
*H02H 9/04* (2006.01)
*H02G 15/113* (2006.01)
*H02H 7/20* (2006.01)

(52) U.S. Cl.
CPC ........... *H02H 9/041* (2013.01); *H02G 15/113* (2013.01); *H02H 7/20* (2013.01)

(58) Field of Classification Search
CPC .......... H02H 9/005; H02H 9/041; H02H 7/20; H02G 15/113
See application file for complete search history.

(56) References Cited

U.S. PATENT DOCUMENTS

| | | |
|---|---|---|
| 3,165,372 A | 1/1965 | Jacobs |
| 3,781,461 A | 12/1973 | Thompson |
| 3,976,351 A | 8/1976 | Hopfe |
| 4,030,061 A | 6/1977 | Gaskell et al. |
| 4,236,190 A | 11/1980 | Hollingsead et al. |
| 4,918,565 A | 4/1990 | King |
| 4,976,508 A | 12/1990 | Okura |
| 5,030,128 A | 7/1991 | Herron et al. |
| 5,311,397 A | 5/1994 | Harshberger et al. |
| D361,314 S | 8/1995 | Ryan |

(Continued)

FOREIGN PATENT DOCUMENTS

| | | |
|---|---|---|
| DE | 20 2005 021740 U1 | 8/2009 |
| DE | CH698717 B1 | 10/2009 |

(Continued)

OTHER PUBLICATIONS

"Relay" from Wikipedia. Downloaded Oct. 30, 2009.

(Continued)

*Primary Examiner* — Zeev V Kitov (57) ABSTRACT

A telecommunications system uses a breakout device to connect a primary power cable to different secondary power cables that connect to different remote radio units (RRUs). For example, the breakout device may include a power distribution terminal that connects −48 VDC and return power lines in the primary power cable to different −48 VDC and return power lines in the secondary power cables. In another example, the breakout device may connect a hybrid cable that includes both power lines and fiber optic lines. A surge protection system may be located in the breakout device to protect the RRUs and other electrical device from power surges. Alternatively, the surge protection system may be located in jumper power cables connected between the breakout device and the RRUs.

19 Claims, 13 Drawing Sheets

(56) References Cited

U.S. PATENT DOCUMENTS

| | | | |
|---|---|---|---|
| D362,232 S | 9/1995 | Ryan | |
| 5,473,718 A | 12/1995 | Sommer | |
| 5,491,766 A | 2/1996 | Huynh | |
| 5,530,215 A | 6/1996 | Couvreur | |
| 5,555,153 A | 9/1996 | Frederiksen | |
| 5,602,532 A | 2/1997 | Ryan | |
| 5,627,721 A | 5/1997 | Figueiredo | |
| 5,651,698 A | 7/1997 | Locati et al. | |
| 5,701,227 A | 12/1997 | Ryan | |
| 5,790,360 A | 8/1998 | Ryan | |
| 5,805,757 A | 9/1998 | Bloom | |
| 5,903,693 A | 5/1999 | Brown | |
| 5,914,845 A * | 6/1999 | Chase | H02H 9/042 361/111 |
| 5,953,193 A | 9/1999 | Ryan | |
| 5,966,282 A | 10/1999 | Ryan | |
| 5,969,932 A | 10/1999 | Ryan | |
| 6,031,706 A | 2/2000 | Nabell | |
| 6,038,119 A | 3/2000 | Atkins | |
| 6,074,247 A | 6/2000 | Hall | |
| 6,114,632 A * | 9/2000 | Planas, Sr. | H01B 9/003 174/117 R |
| 6,122,156 A | 9/2000 | Nabell | |
| 6,389,214 B1 | 5/2002 | Smith | |
| 6,430,020 B1 | 8/2002 | Atkins | |
| 6,535,369 B1 | 3/2003 | Redding et al. | |
| 6,556,402 B2 | 4/2003 | Kizis | |
| 6,623,315 B1 | 9/2003 | Roderick | |
| 6,654,223 B1 | 11/2003 | Bippus | |
| 6,719,615 B1 | 4/2004 | Molnar | |
| 6,729,902 B2 | 5/2004 | Martich | |
| 6,738,555 B1 | 5/2004 | Cooke | |
| 6,771,861 B2 | 8/2004 | Wagner | |
| 6,851,966 B1 | 2/2005 | Tomasino | |
| 6,876,533 B1 | 4/2005 | Ryan | |
| 7,008,256 B2 | 3/2006 | Poiraud | |
| 7,035,073 B2 | 4/2006 | Bennett et al. | |
| 7,228,047 B1 | 6/2007 | Szilagyi | |
| 7,270,485 B1 | 9/2007 | Robinson | |
| 7,397,673 B1 | 7/2008 | Wilson | |
| 7,433,169 B2 | 10/2008 | Kamel | |
| 7,664,363 B1 | 2/2010 | Mowery, Sr. | |
| 7,768,794 B1 | 8/2010 | Wilson | |
| 7,946,863 B2 | 5/2011 | Loch | |
| 7,972,067 B2 | 7/2011 | Haley | |
| 8,021,189 B2 | 9/2011 | Zayas et al. | |
| 8,279,067 B2 | 10/2012 | Berger | |
| 8,457,461 B2 | 6/2013 | Ott | |
| 8,467,655 B2 | 6/2013 | German | |
| 8,490,799 B2 | 7/2013 | Knight | |
| 8,526,200 B2 | 9/2013 | Miller | |
| 8,730,639 B1 | 5/2014 | Wilson | |
| 8,780,519 B2 | 7/2014 | Miller | |
| 8,810,990 B1 | 8/2014 | Miller | |
| 8,831,395 B2 | 9/2014 | Sievers | |
| 8,839,594 B2 | 9/2014 | Smith | |
| 8,873,926 B2 | 10/2014 | Beamon | |
| 8,938,143 B2 | 1/2015 | Do | |
| 8,995,106 B2 | 3/2015 | Miller | |
| 9,057,862 B2 | 6/2015 | Strasser | |
| 9,099,860 B2 | 8/2015 | Martinez | |
| 9,140,872 B2 | 9/2015 | Sedor | |
| 9,281,866 B2 | 3/2016 | Smentek | |
| 9,383,521 B2 | 7/2016 | Dendas | |
| 2001/0053971 A1 | 12/2001 | Demetrescu | |
| 2002/0055306 A1 | 5/2002 | Jenks | |
| 2002/0196593 A1 | 12/2002 | Kizis | |
| 2003/0027521 A1 | 2/2003 | Yip et al. | |
| 2003/0148668 A1 | 8/2003 | Lias | |
| 2004/0119386 A1 | 6/2004 | Guidez | |
| 2004/0198451 A1* | 10/2004 | Varghese | H04B 1/18 455/562.1 |
| 2004/0246693 A1 | 12/2004 | Lloyd | |
| 2005/0036262 A1* | 2/2005 | Siebenthall | H03H 1/0007 361/118 |
| 2005/0042920 A1 | 2/2005 | Poiraud | |
| 2005/0157461 A1 | 7/2005 | Cauthron | |
| 2006/0139836 A1 | 6/2006 | Anthony | |
| 2006/0153362 A1* | 7/2006 | Bloodworth | G02B 6/4448 379/413.02 |
| 2007/0163801 A1 | 7/2007 | Coffey et al. | |
| 2007/0217101 A1* | 9/2007 | Carter | H04M 19/08 361/54 |
| 2008/0037188 A1 | 2/2008 | Wilson | |
| 2008/0117555 A1 | 5/2008 | Wilson | |
| 2008/0139045 A1 | 6/2008 | Ho | |
| 2008/0186667 A1 | 8/2008 | Verdelli et al. | |
| 2008/0278889 A1 | 11/2008 | Briggs et al. | |
| 2008/0310060 A1 | 12/2008 | Metral et al. | |
| 2009/0103218 A1 | 4/2009 | Ryan | |
| 2009/0103881 A1 | 4/2009 | Gonzalez | |
| 2010/0034507 A1 | 2/2010 | Sielaff | |
| 2010/0054676 A1 | 3/2010 | Cooke | |
| 2010/0259871 A1 | 10/2010 | Ewing | |
| 2011/0135316 A1 | 6/2011 | Fankhauser | |
| 2012/0051710 A1 | 3/2012 | Zeng | |
| 2012/0092835 A1 | 4/2012 | Miller | |
| 2012/0200978 A1 | 8/2012 | Miller | |
| 2012/0200979 A1 | 8/2012 | Miller | |
| 2012/0230636 A1 | 9/2012 | Blockley | |
| 2012/0319485 A1 | 12/2012 | Ewing | |
| 2013/0146355 A1 | 6/2013 | Strasser | |
| 2013/0170801 A1 | 7/2013 | Do | |
| 2013/0294735 A1* | 11/2013 | Burris | G02B 6/4415 385/101 |
| 2013/0340361 A1 | 12/2013 | Rogers | |
| 2014/0168842 A1 | 6/2014 | Martinez | |
| 2015/0003790 A1 | 1/2015 | Wu | |
| 2015/0155669 A1 | 6/2015 | Chamberlain | |
| 2015/0155706 A1 | 6/2015 | Miller | |
| 2015/0234405 A1 | 8/2015 | Chamberlain | |

FOREIGN PATENT DOCUMENTS

| | | |
|---|---|---|
| EP | 1855365 | 11/2007 |
| EP | 2 469 661 | 6/2012 |
| EP | 2 469 661 A1 | 6/2012 |
| GB | 2421641 A | 6/2006 |
| JP | 2005317472 | 12/2002 |
| WO | WO2006076120 | 7/2006 |
| WO | 2008/059212 A1 | 5/2008 |
| WO | 2012/108929 | 8/2012 |
| WO | 2012/108930 | 8/2012 |
| WO | 2013/165657 | 11/2013 |
| WO | 2013/165657 A1 | 11/2013 |

OTHER PUBLICATIONS

Written Opinion for PCT/US11/064704; Date of mailing: May 16, 2012.
Written Opinion for PCT/US11/064717; Date of mailing: May 16, 2012.
International Search Report for PCT/US11/064704; Date of mailing: May 16, 2012.
International Search Report for PCT/US11/064717: Date of mailing: May 16, 2012.
Stolowitz Ford Cowger LLP, Listing of Related Cases, Oct. 3, 2013.
Preliminary Report on Patentablity and Written Opinion of the International Searching Authority for PCT/US2011/064717; Date of mailing Aug. 13, 2013.
Preliminary Report on Patentablity and Written Opinion of the International Searching Authority for PCT/US2011/064704; Date of mailing Aug. 13, 2013.

* cited by examiner

CABLE BREAKOUT ASSEMBLY

The present application incorporates by reference in its entirety U.S. patent application Ser. No. 13/301,720, Entitled: Overvoltage Protection System for Wireless Communication Systems, filed Nov. 21, 2012.

FIELD

This application relates generally to surge protection systems.

BACKGROUND

Latest generation wireless communications systems include distributed antenna systems (DAS), distributed direct current (DC) radio systems, remote radio heads (RRH), 4G and long term evolution (LTE) cellular communication systems. These communications systems now commonly locate radios next to antennas on towers outside of communications shelters. Active Antenna Systems also may use similar installation configurations where the antennas and the radios are one unit.

The radios are located outside of the communications shelter on top of the tower and are therefore more susceptible to damage from lighting strikes and other electrical power surge events. Individual power lines run to each individual radio also increasing the amount of power cabling exposed to power surge events. Thus, DC power plants and telecommunication equipment at communication stations with distributed power have more risk of damage due to direct lighting strikes and power surges.

DETAILED DESCRIPTION

Several preferred examples of the present application are described with reference to the accompanying drawings. Various other examples of the invention are also possible and practical. This application may be exemplified in many different forms and should not be construed as being limited to the examples set forth herein.

Figure 1:
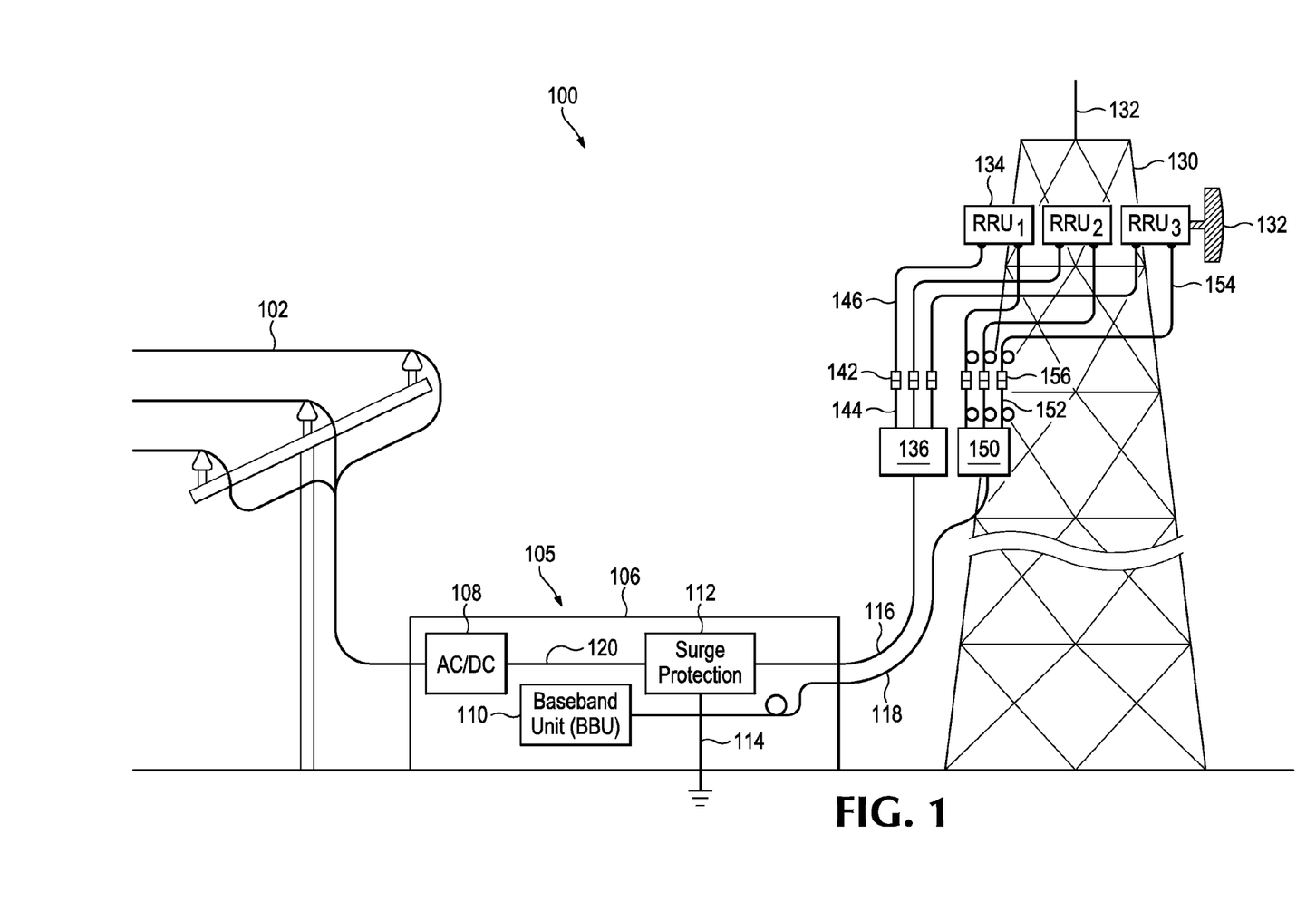
FIG. 1 depicts an example telecommunications system.
Figure 2:
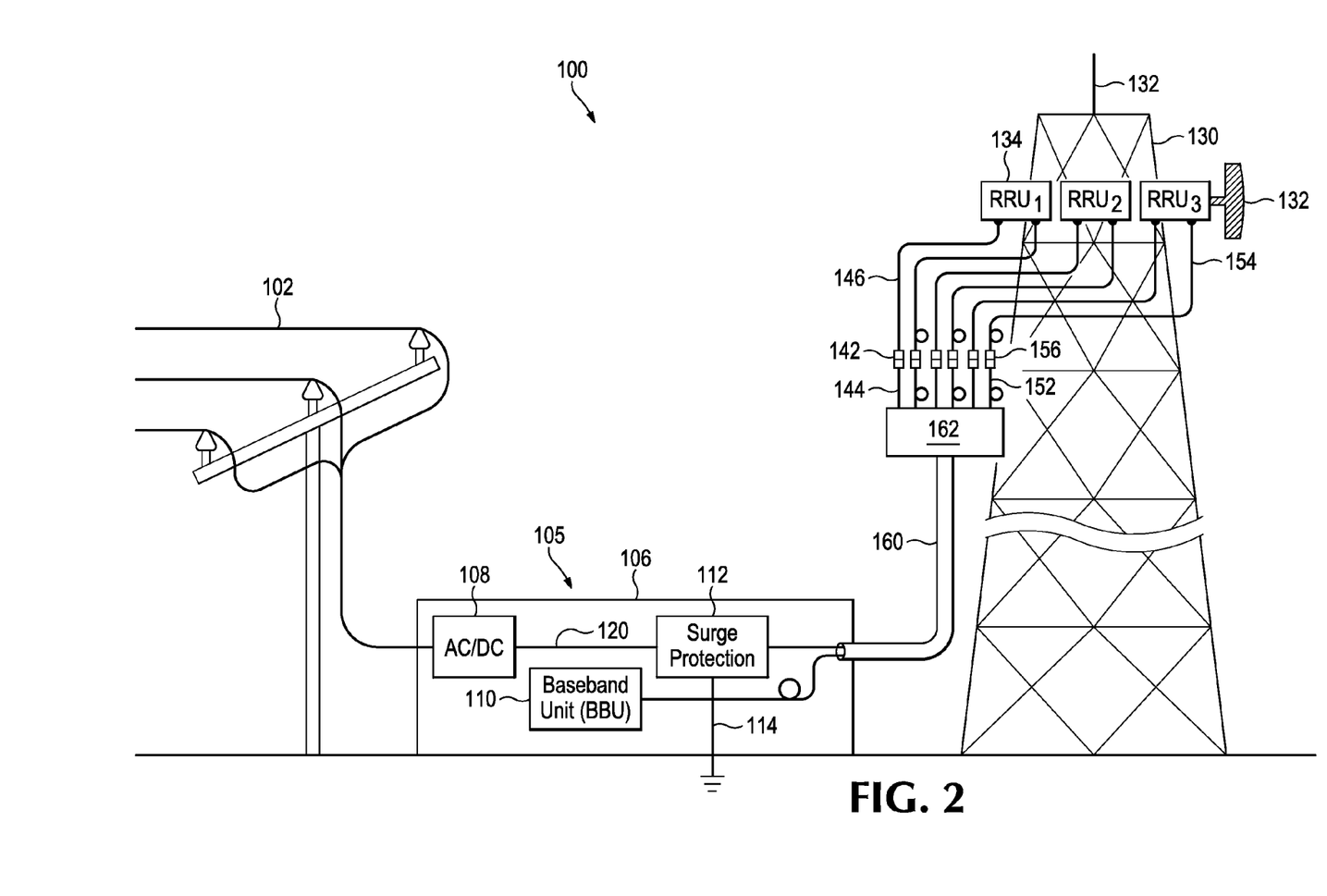
FIG. 2 depicts another example telecommunications system.

FIG. 1 illustrates one example of a wireless communication station 100. FIG. 2 shows another example of a wireless communication station 100. Referring both to FIGS. 1 and 2, antennas 132 are located on top of a tower 130. Remote radio units (RRUs) 134 are connected to the antennas 132, in one example, send, and receive cellular telephone transmissions. However, RRUs 134 and antennas 132 may be part of any type or wireless communications. In other examples, RRUs 134 and antennas 132 may be located on other structures, such as on a roof of a building.

A building 106 contains computing equipment for a base transceiver station (BTS) 105. A baseband unit (BBU) 110 within building 106 remotely controls radio traffic on RRUs 134 through a primary fiber optic cable 118. BBU 110 and radios within RRUs 134 may be separated by up to several hundred feet. An alternating current/direct current (AC/DC) power plant 108 receives power from power lines 102. Power plant 108 is connected through a DC power bus 120 and a primary DC power cable 116 to RRUs 134 on tower 130.

To avoid running multiple individual DC power lines up tower 130 to each RRU 134, primary DC power cable 116 may include multiple DC power lines. To avoid running multiple fiber optic lines up tower 130 to each RRU 134, primary fiber optic cable 118 may include multiple fiber optic lines.

A DC cable breakout device 136 divides the multiple DC power lines in primary DC power cable 116 into different individual secondary DC power cables 144. Secondary DC power cables 144 extend out of breakout device 136 and connect through DC connectors 142 to jumper power cables 146 that connect to different RRUs 134.

A fiber optic (FO) breakout device 150 separates the fiber optic lines in primary FO cable 118 into multiple individual secondary fiber optic cables 152. Secondary fiber optic cables 152 connect through fiber optic connectors 156 to jumper fiber optic cables 154 that connect to RRUs 134.

FIG. 2 shows another example where one or more DC power cables and one or more fiber optic cables are bundled together in one hybrid cable 160. A hybrid cable breakout device 162 divides power lines in hybrid cable 160 into individual secondary DC power cables 144 and divides FO lines in hybrid cable 160 into secondary optical fiber cables 152. The individual secondary DC power cables 144 again terminate to DC connectors 142 and the individual secondary FO cables 152 again terminate to FO connectors 156.

Jumper power cables 146 connect at a first end to DC connectors 142 and connect at a second end to RRUs 134. Jumper FO line cables 154 connect at a first end to FO connectors 156 and connect at a second end to RRUs 134.

Active equipment such as BBU 110, power plant 108, RRUs 134 and antennas 132 are susceptible to damage due to direct lightning strikes and other electrical power surge events. Surge protection systems protect the active equipment within building 106 and the active equipment on tower 130 from the power surge events. In one example, a surge protection unit 112 is located within building 106 and connects to power lines within primary DC power cable 116 in FIG. 1 or power lines within hybrid cable 160 in FIG. 2. Examples of surge protection unit 112 are described in U.S. patent application Ser. No. 13/301,720; entitled: OVERVOLTAGE PROTECTION SYSTEM FOR WIRELESS COMMUNICATION SYSTEMS, filed Nov. 20, 2012, which has been incorporated by reference in its entirety.

Breakout device 136 in FIG. 1 and/or hybrid cable breakout device 162 in FIG. 2 may provide additional integrated surge protection on the DC power lines feeding RRUs 134. Breakout devices 136 and 162 may include enclosures made from plastic, metal, or another watertight material. Breakout devices 136 and 162 may have any shape, such as a cylindrical or rectangular shape with openings for receiving cables 116 or 160. Surge suppression systems are located within the breakout device enclosures.

Figure 3:
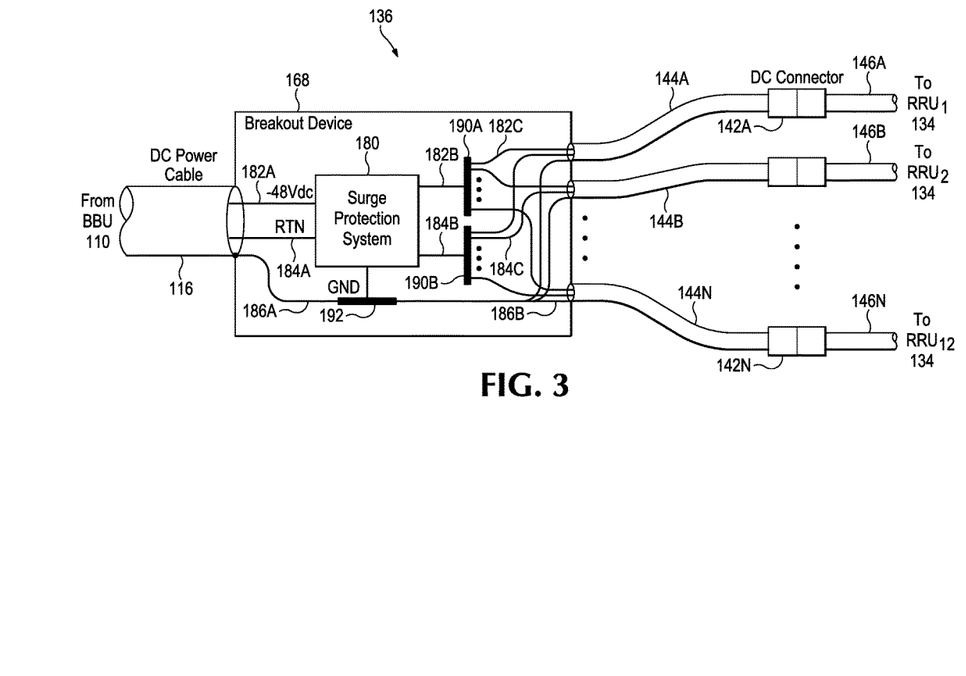
FIG. 3 depicts an example surge protection system for a DC power cable.

FIG. 3 shows in more detail one example of DC cable breakout device 136 in FIG. 1. A first end of an enclosure 168 serves as the entry point for primary DC power cable 116. A second end of enclosure 168 serves is an exit point for individual secondary DC power cables 144. Breakout device 136 separates primary DC power cable 116 into smaller size secondary DC power cables 144A-144N that feed different RRUs 134. Each DC power cable 144A-144N may contain one −48 VDC power line 182C, one return power line 184C, and one ground line 186B.

In one example, primary DC power cable 116 entering breakout device 136 may contain two-wires comprising a −48 VDC power line 182A and return power line 184A. In another example, primary DC power cable 116 may comprise three-wires including −48 VDC power line 182A, return power line 184A, and a ground line 186A. In yet another example, primary DC power cable 116 could include several pairs of DC power cables that are separated inside of breakout device 136 and feed directly to RRUs 134.

A surge protection system 180 is coupled to lines 182A, 184A, and 186A. A −48 VDC power line 182B is coupled between surge protection system 180 and a power distribution terminal 190A. A return power line 184B is coupled between surge protection system 180 and a power distribution terminal 190B.

Multiple −48 VDC power lines 182C from different secondary DC power cables 144A-144N may connect to power distribution terminal 190A. Multiple return power lines 184C from the different secondary DC power cables 144A-144N may connect to power distribution terminal 190B. A ground terminal 192 may connect ground line 186A to surge protection system 180. Multiple ground lines 186B from the different secondary DC power cables 144A-144N may connect to ground terminal 192.

In one example, power distribution terminals 190A and 190B, and ground terminal 192, may comprise conductive pieces of metal. Screws and/or posts may extend out from the front and/or backsides of terminals 190A, 190B, and 192. The −48 VDC power lines 182B and 182C may attach to the screws and/or posts electrically connecting all of the −48 VDC power lines together. Terminals 190B and 192 may use similar configurations. This is just one example and any type of connector can connect different lines together.

The DC connectors 142A-142N connect secondary DC power cables 144A-144N to jumper power cables 146A-146N, respectively. In one example, up to 12 RRUs 134 may be located on tower 130 in FIG. 1. A separate jumper power cable 146A-146N may connect between each DC connector 142A-142N and each RRU 134.

Figure 4:
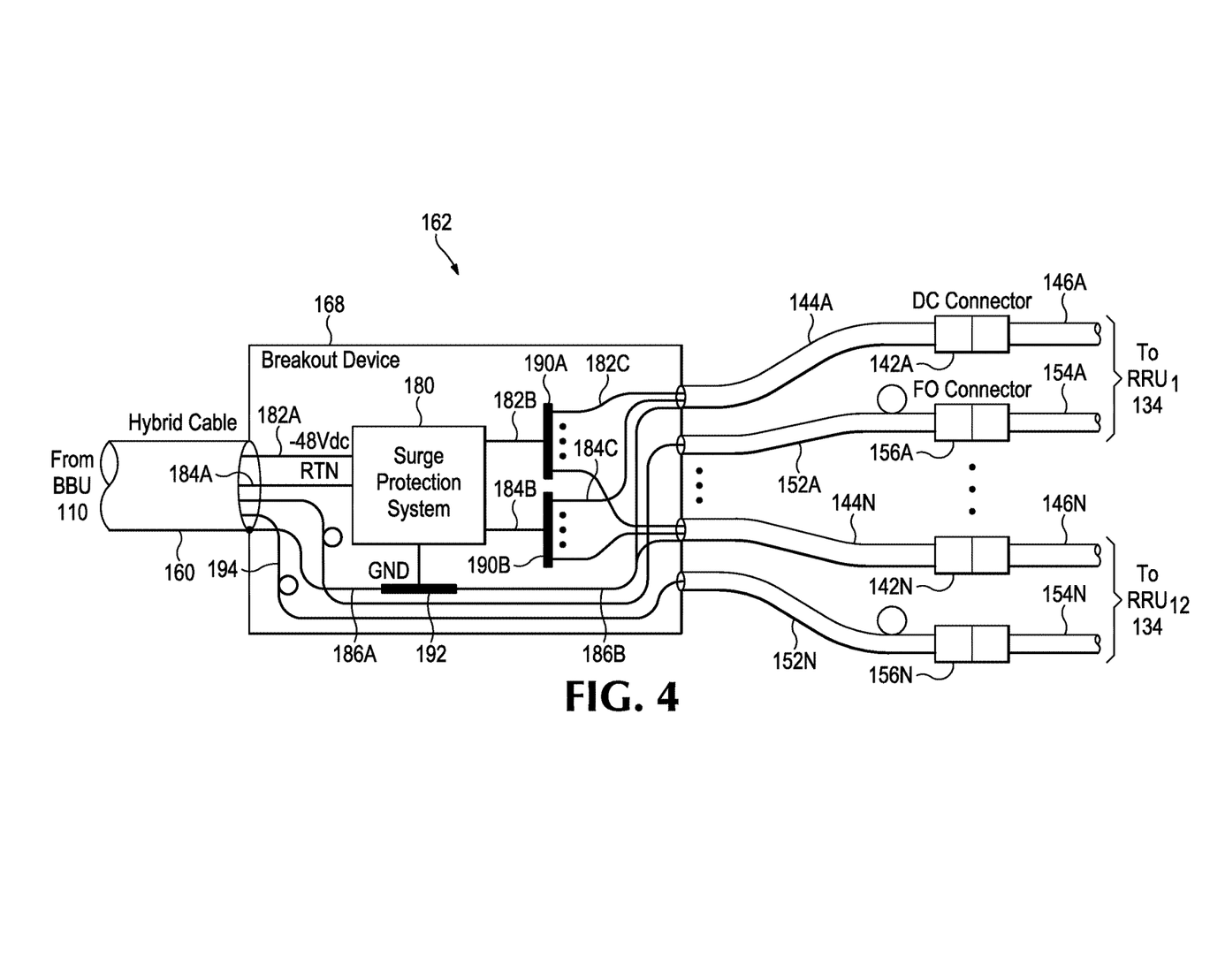
FIG. 4 depicts another example surge protection system for a hybrid cable.

FIG. 4 shows in more detail one example of hybrid cable breakout device 162 of FIG. 2. Hybrid cable 160 may include both a −48 VDC power line 182A, a return power line 184A and one or more fiber optic lines 194. Power lines 182A and 184A connect to surge protection system 180 and power lines 182B and 184B connect to power distribution terminals 190A and 190B, respectively, as described above in FIG. 3. The −48 VDC power lines 182C in secondary DC power cables 144A-144N connect to power distribution terminal 190A and return power lines 184C in secondary DC power cables 144A-144N connect to power distribution terminal 190B. Ground lines 186B in secondary DC power cables 144A-144N connect to ground terminal 192

Secondary FO cables 152A-152N connect at one end to FO lines 194 in hybrid cable 160 and connect at an opposite end to FO connectors 156A-156N, respectively. The FO connectors 156A-156N also connect to jumper FO cables 154A-154N, respectively. Jumper FO cables 154A-154N connect to the different RRUs 134.

Figure 5:
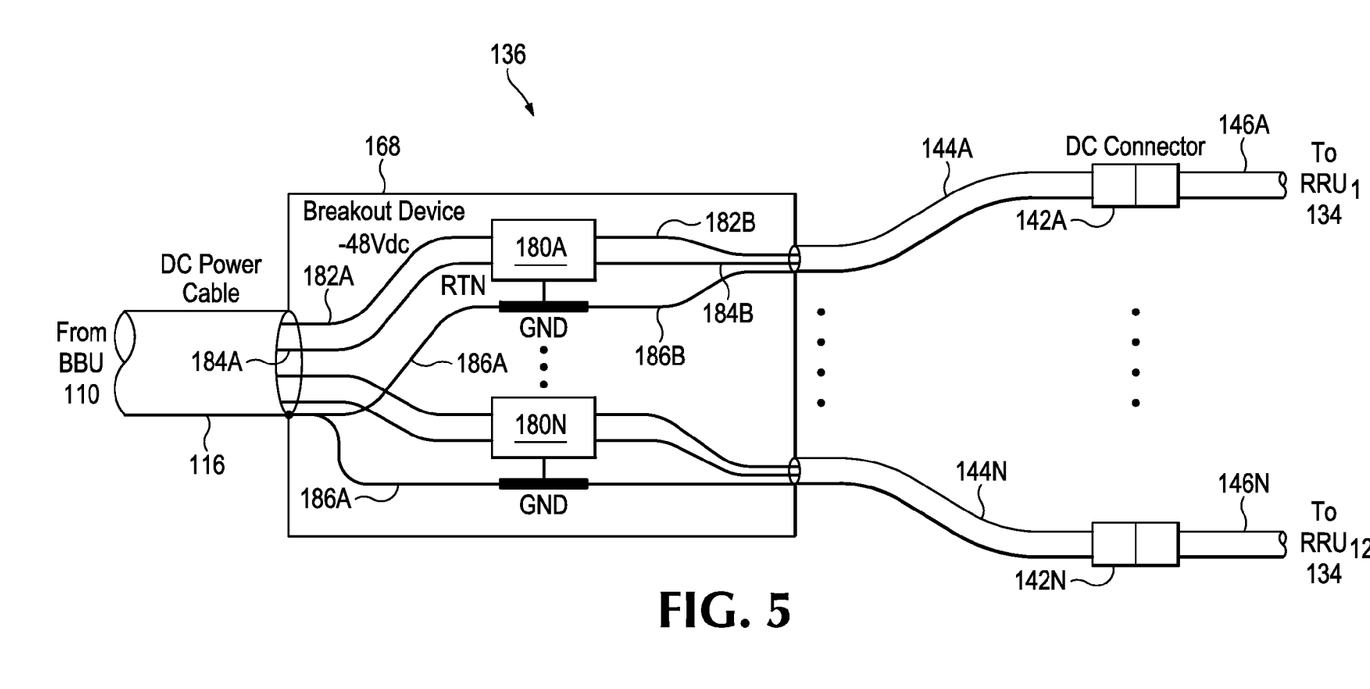
FIG. 5 depicts another example of multiple surge protection systems located in a breakout device.

FIG. 5 shows another example breakout device 136 that includes separate surge protection systems 180A-180N connected to each pair of power lines contained in DC power cable 116. For example, a first −48 VDC power line 182A, a first return power line 184A, and a ground line 186A in primary DC power cable 116 are connected to a first surge protection device 180A. The −48 VDC power line 182B and return power line 184B in secondary DC power cable 144A are also connected to surge protection system 180A. Other sets of power lines 182A, 184A, 182B, and 184B are connected to other surge protection systems 180.

Figure 6:
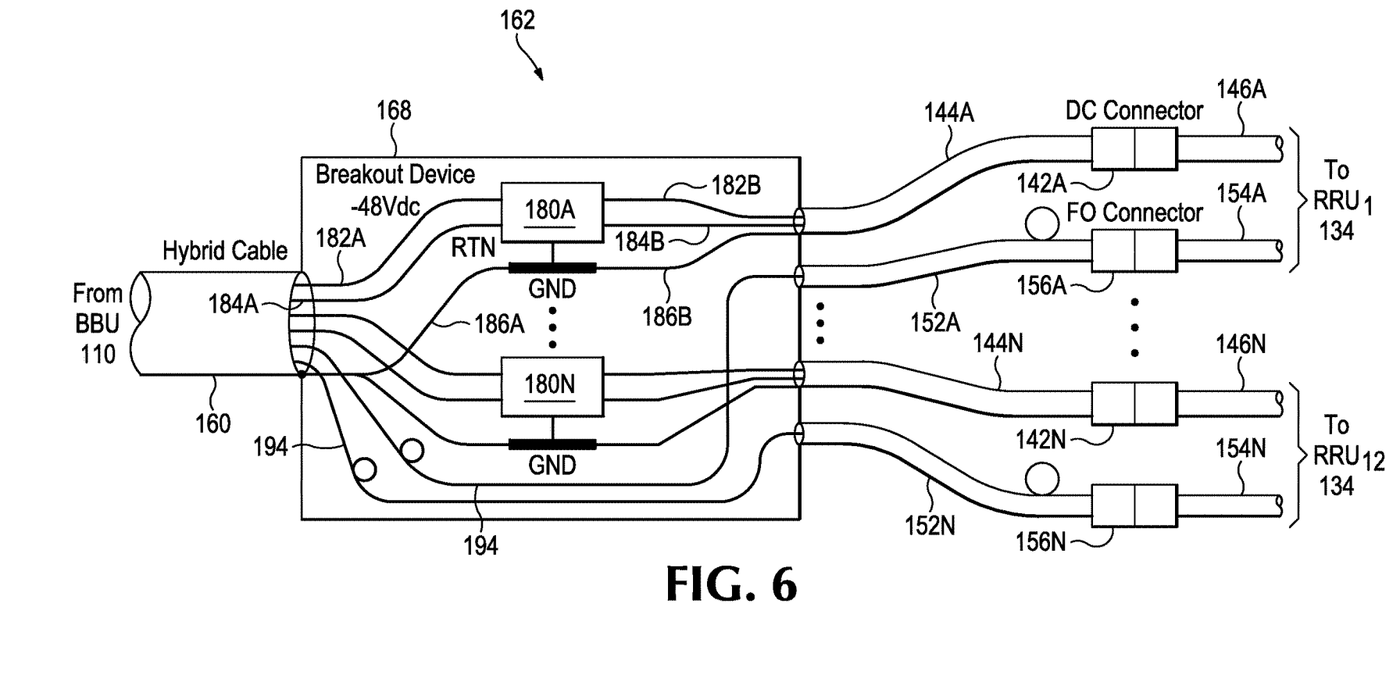
FIG. 6 depicts an example of multiple surge protections systems used in a breakout device for a hybrid cable.

FIG. 6 shows another example hybrid cable breakout device 162. In this example, separate surge protection systems 180A-180N are connected to each different pair of power lines 182 and 184. For example, a first −48 VDC power line 182A, a first return power line 184A, and a ground line 186A from primary DC power cable 160 are connected to first surge protection device 180A. The −48 VDC power line 182B, return power line 184B, and ground line 186B in secondary DC power cable 144A are also connected to surge protection system 180A. Each FO line 194 in hybrid cable 160 is connected to one of secondary FO cable 152A-152N. Jumber FO cables 154A-154N are connected at a first end to FO connectors 156A-156N, respectively, and connected at a second end to one of RRUs 134.

Other surge protection systems 180 are connected to other sets of power and ground lines 182A, 184A, and 186A in hybrid cable 160 and associated sets of power and ground lines 182B, 184B, and 186B in secondary DC power cables 144. Other FO lines 194 in hybrid cable 160 are connected to other secondary FO cables 152.

Figure 7:
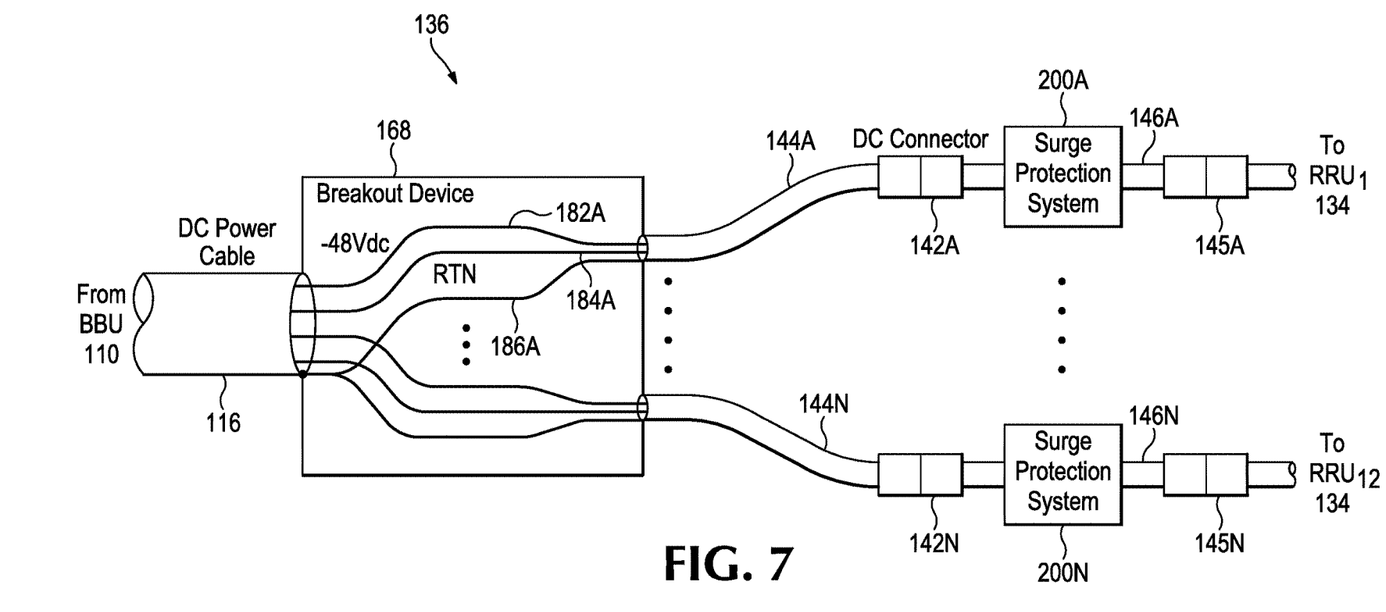
FIG. 7 depicts an example of multiple surge protection systems located within jumper power cables.

FIG. 7 depicts an example where surge protection systems are installed on jumper power cables outside of the breakout device. In this example, primary DC power cable 116 contains multiple pairs of −48 VDC power lines 182A and return lines 184A. Each secondary DC power cable 144 is connected inside of breakout device 136 to one pair of −48 VDC power line 182A and return power line 184A, and a ground line 186A. For example, the power lines in secondary DC power cable 144 may be crimped to the associated power lines in DC power cable 116.

Each DC connector 142 connects one of secondary DC power cables 144 to one of power jumper cables 146. Surge protection systems 200A-200N are installed in power jumper cables 146A-146N, respectively. Power jumper cables 146A-146N are connected between DC connectors 142A-142N and DC connectors 145A-145N, respectively. Power cables connected to the opposite ends of DC connectors 145A-145N are connected RRUs 134.

Surge protection systems 200A-200N can be preinstalled into power jumper cables 146A-146N, respectively. If any surge protection systems 200A-200N need to be inserted or replaced, the associated power jumper cable 146 can be detactably removed via DC connectors 142 and 145. A new power jumper cable 146 with a new surge protection system 200 can then be reattached via DC connectors 142 and 145 in-between the power cables already connected to breakout device 136 and RRU 134.

Figure 8:
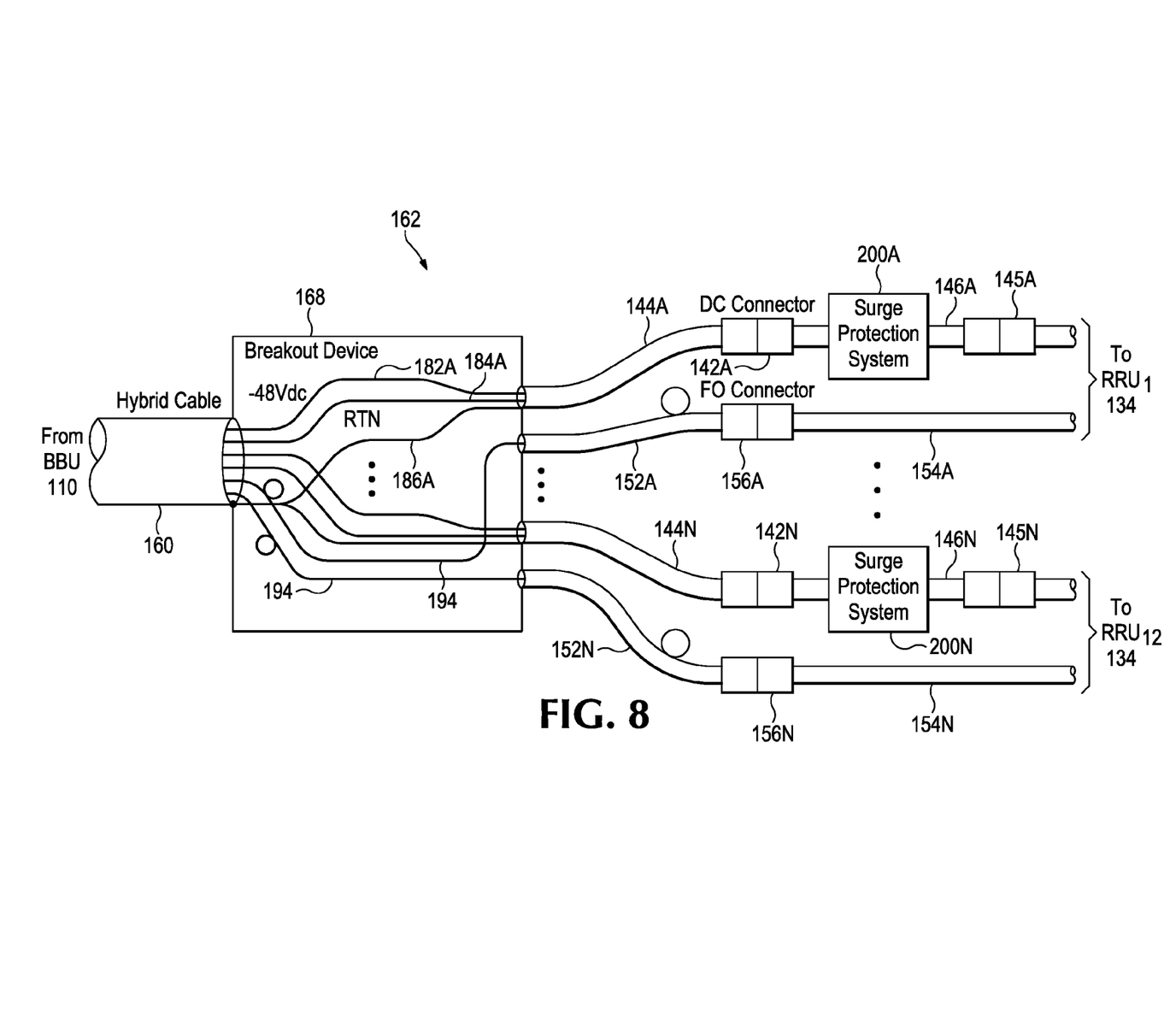
FIG. 8 depicts another example of multiple surge protections systems located within jumper power cables.

FIG. 8 shows another example where surge protection systems 200 are installed in jumper power cables 146. Hybrid cable 160 includes multiple pairs of −48 VDC power lines 182A and return lines 184A. Hybrid cable 160 also includes multiple FO lines 194. The FO lines 194 are each connected to a different secondary FO cables 152A-152N. FO connectors 156A-156N connect secondary FO cables 152A-152N to jumper FO cables 154A-154N that connect to different RRUs 134, respectively.

Pairs of power lines 182A and 184A and ground line 186A in hybrid cable 160 are each connected to a different secondary DC power cable 144A-144N. Separate DC connectors 142A-142N connect the secondary DC power cables 144A-144N to associated jumper power cables 146A-146N, respectively. Surge protection systems 200A-200N are again installed in jumper power cables 146A-146N, respectively. Power jumper cables 146A-146N are connected between DC connectors 142A-142N and DC connectors 145A-145N, respectively. Power cables connected to the opposite ends of DC connectors 145A-145N are connected RRUs 134.

Figure 9:
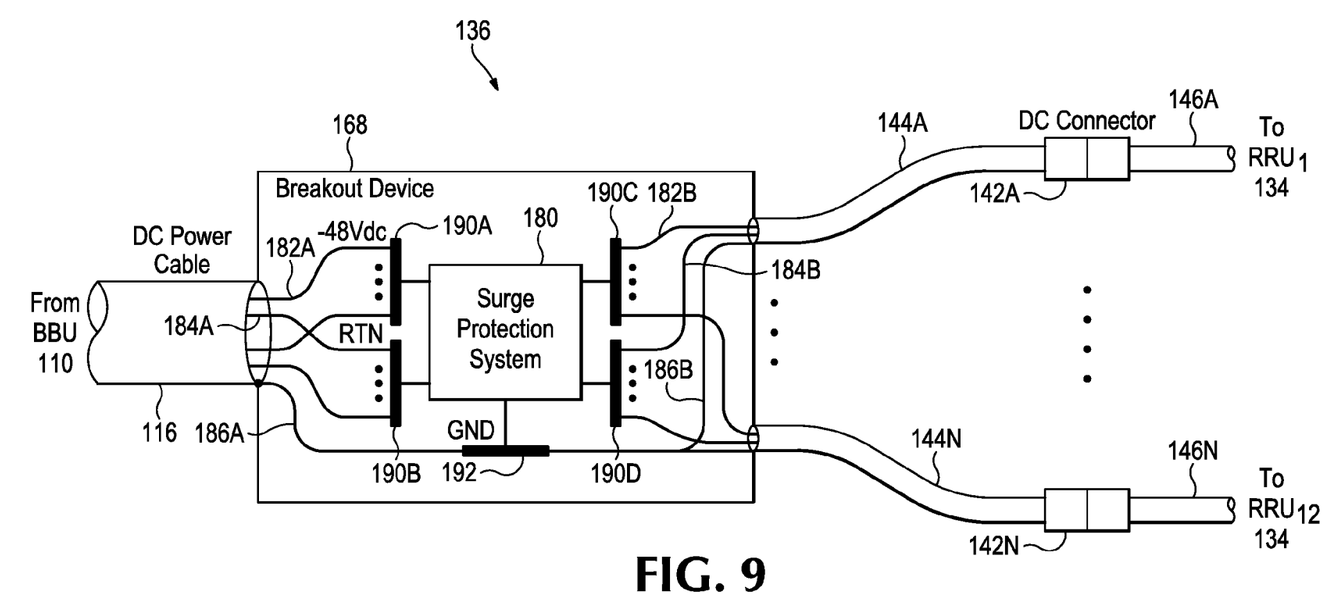
FIG. 9 depicts an example surge protection system connected to multiple power distribution terminals.

FIG. 9 depicts another example, where multiple individual DC power lines entering breakout device 136 from primary DC power cable 116 are connected together. All −48 VDC power lines 182A from primary DC power cable 116 are connected together by power distribution terminal 190A and all return power lines 184A from DC power cable 116 are connected together by power distribution terminal 190B. Ground line 186A is connected to surge protection system 180 via ground terminal 192.

All −48 VDC power lines 182B from secondary DC power cables 144A-144N are connected to a power distribution terminal 190C and all return power lines 184B from secondary DC power cables 144A-144N are connected to a power distribution terminal 190D. All ground lines 186B from secondary DC power cables 144A-144N are connected to ground terminal 192.

In this configuration, a single surge protection system 180 is connected between power distribution terminals 190A and 190B, and power distribution terminals 190C and 190D. As mentioned above, in one example, primary DC power cable 116 may include up to 12 individual pairs of power lines 182A and 184A. The configuration in FIG. 9 enables one surge protection system 180 to protect all 12 pairs of power lines and associated connected RRUs 134.

Figure 10:
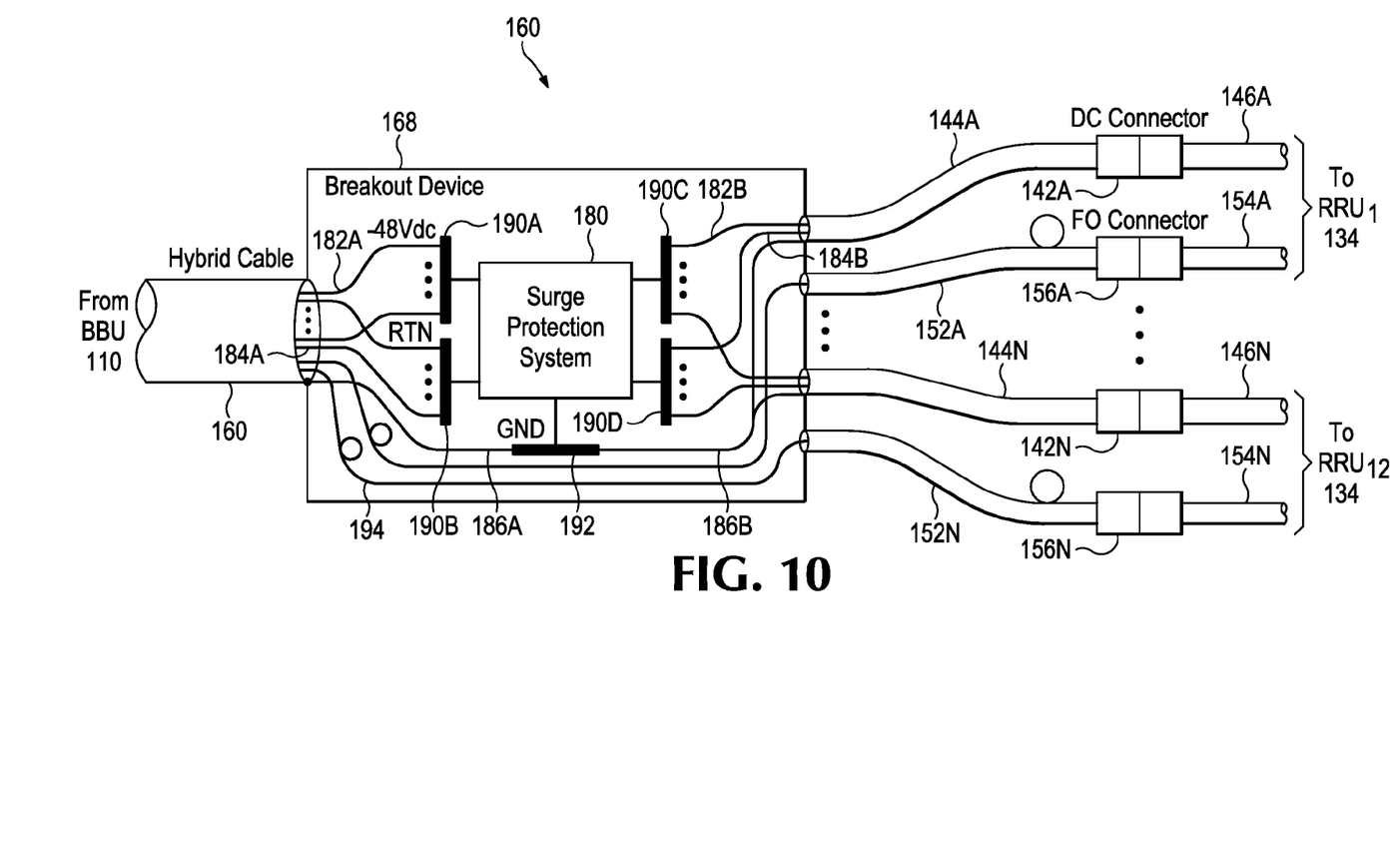
FIG. 10 depicts an example surge protection system connected to multiple power distribution terminals within a hybrid cable breakout device.

FIG. 10 depicts another example where a single surge protection system 180 is used for protecting multiple power lines and multiple RRUs 134. As described above in FIG. 9, a single surge protection system 180 is connected to power distribution terminal 190A and power distribution terminal 190B. Surge protection system 180 is also connected to power distribution terminal 190C and power distribution terminal 190D.

Hybrid cable 160 includes multiple pairs of −48 VDC power lines 182A and return lines 184A. Hybrid cable 160 also includes multiple FO lines 194. The −48 VDC power lines 182A are connected to power distribution terminal 190A and return power lines 184A are all connected to power distribution terminal 190B. Ground line 186A is coupled to surge protection system 180 via ground terminal 192.

Secondary DC power cables 144A-144N include −48 VDC power lines 182B that are connected together via power distribution terminal 190C, return power lines 184B connected together via power distribution terminal 190D, and a ground line connected to ground terminal 192. The FO lines in secondary FO cables 152 are each connected to different FO lines 194 from hybrid cable 160.

Figure 11:
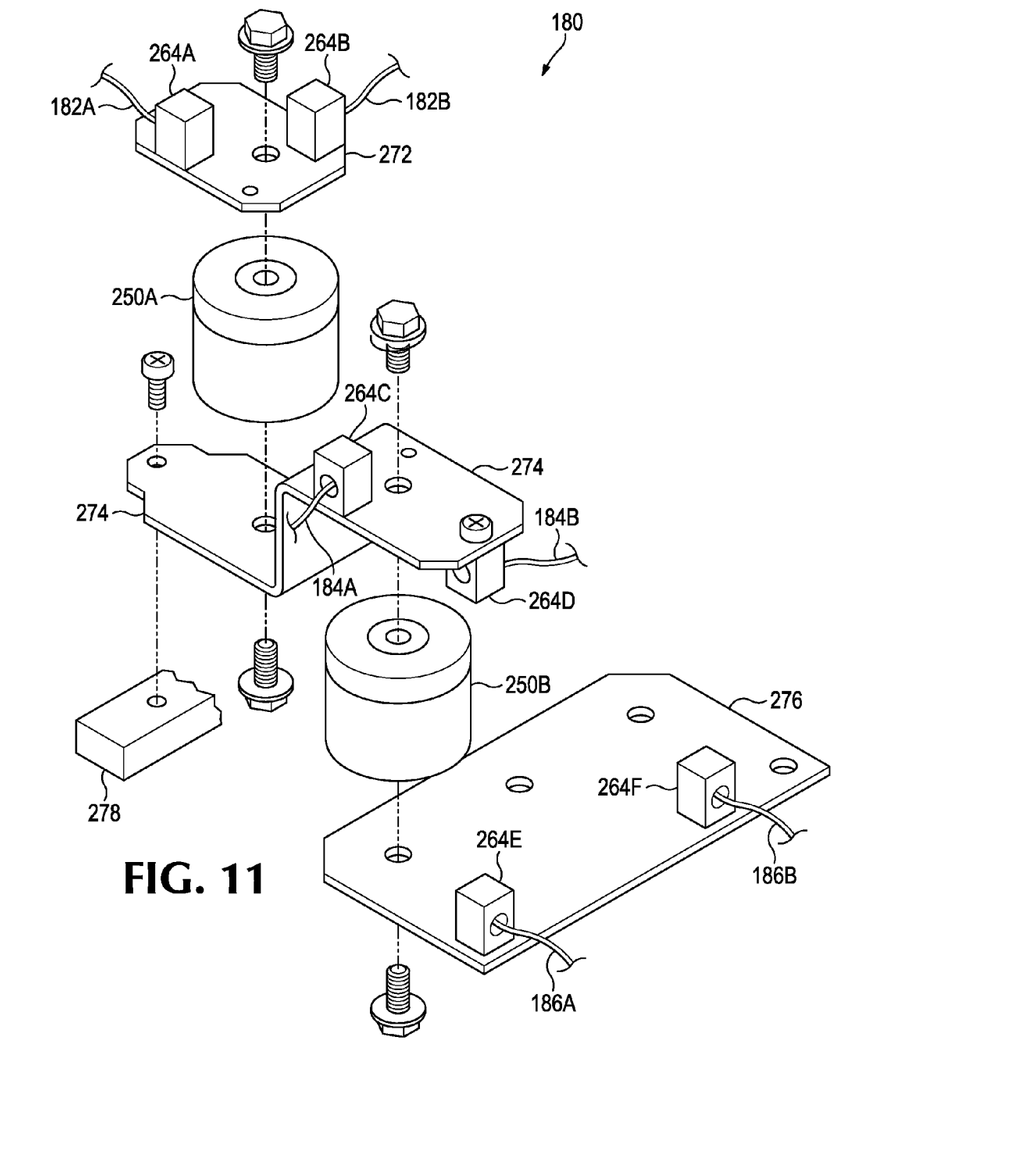
FIG. 11 depicts an example of surge protection devices used in the surge protection system within a breakout device.

FIG. 11 shows an exploded perspective view of surge protection devices 250A and 250B connected together in surge protection system 180. A first bus bar 272 includes a terminal 264A that connects −48 VDC power line 182A to a top end of surge protection device 250A. Bus bar 272 also includes a terminal 264B that connects −48 VDC power line 182B to the top end of surge protection device 250A.

A z-shaped bus bar 274 connects horizontally to a bottom end of surge protection device 250A, extends vertically up between surge protection devices 250A and 250B, and extends and connects horizontally to a top end of surge protection device 250B. Terminal 264C on bus bar 274 connects to return power line 184A and terminal 264D on bus bar 274 connects to return power line 184B.

A ground bus bar 276 connects to a bottom end of surge protection device 250B and is attached to the inside wall of the breakout device enclosure mechanically holding surge protection devices 250A and 250B within the breakout device 136 or 160. A terminal 264E connects ground line 186A to ground bus bar 276 and multiple other terminals 264F connect other ground lines 186B to ground bus bar 276. A mounting bar 278 attaches to the bottom of bus bar 274 and further attaches surge protection devices 250A and 250B to the inside wall of the breakout device enclosure.

FIG. 11 is just one example of how surge protection devices 250 may connect together to create surge protection system 180 within breakout device 136 or 160. Other configurations include different bus bar shapes and include other power line connections as shown below in FIG. 13.

Figure 12:
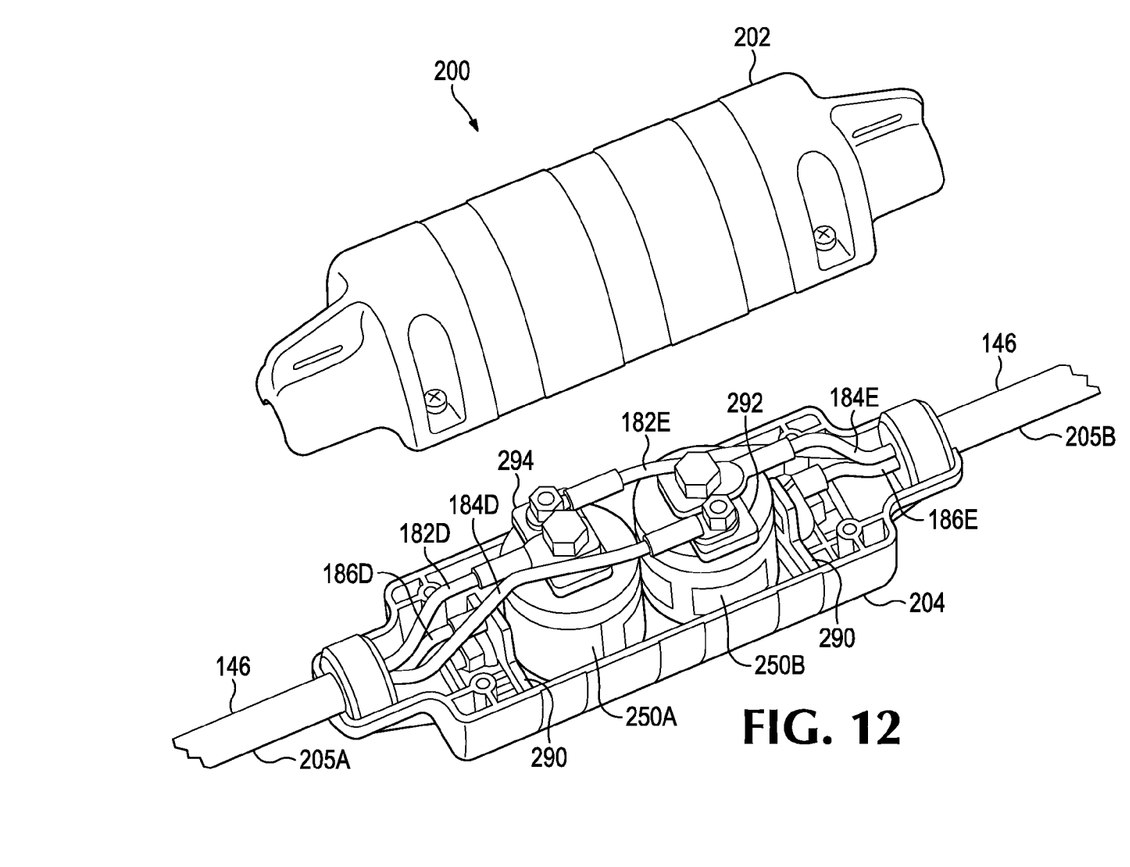
FIG. 12 depicts an example of surge protection devices used in the surge protection system within a jumper cable.

FIG. 12 depicts one example of a surge protection system 200 as shown in FIGS. 7 and 8. A bottom enclosure 204 connects at a first end to a first portion 205A of jumper power cable 146 and connects at a second end to a second portion 205B of jumper power cable 146. Section 205A of jumper power cable 146 connects to one of the DC connectors 142 and includes a −48 VDC power line 182D, a return power line 184D, and a ground line 186D. Section 205B of jumper power cable 146 connects to one of the RRUs 134 and includes a −48 VDC power line 182E, a return power line 184E, and a ground line 186E.

A bus bar 294 connects −48 VDC power lines 182D and 182E to a top end of surge protection device (SPD) 250A. A bus bar 292 connects return power lines 184D and 184E to a top end of SPD 250B. A bus bar 290 is attached to a floor of bottom enclosure 204 and connects ground lines 186D and 186E to the bottom ends of surge protection devices 250A and 250B. Again, FIG. 12 is just one example, of a variety of ways surge protection devices 250A and 250B may be interconnected to form surge protection system 200. FIG. 13 shows other possible connection configurations.

If either of surge protection devices 250A or 250B are destroyed during a power surge event, the entire jumper power cable 146 along with connected surge protection system 200 can be detached from DC connector 142 and the associated RRU 134 (FIGS. 7 and 8). A new jumper power cable 146 including a new surge protection system 200 can then be reattached between DC connector 142 and the associated RRU 134.

Figure 13A:
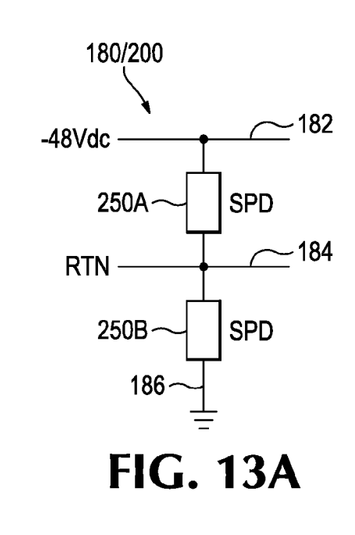
FIGS. 13A-13D depict example schematic diagrams for the surge protection system.

FIG. 13A is a schematic diagram depicting one example connection configuration for surge protection system 180 or 200. The connection configuration in FIG. 13A is similar to what was previously shown in FIG. 11. In this example, −48 VDC power lines 182 are connected to the top end of SPD 250A and return power lines 184 are connected to both the bottom end of SPD 250A and the top end of SPD 250B. Ground line 186 is connected to the bottom end of SPD 250B.

Figure 13B:
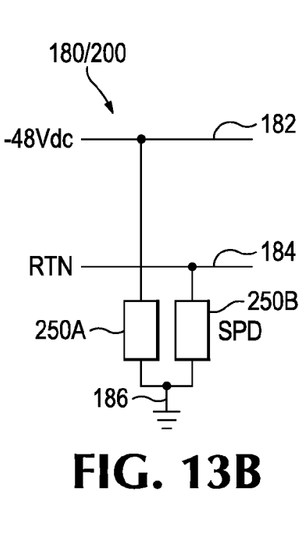

FIG. 13B depicts another example connection configuration for surge protection system 180 or 200 similar to what was previously shown in FIG. 12. In this example, the −48 VDC power lines 182 are connected to the top end of SPD 250A and return power lines 184 are connected to the top end of SPD 250B. Ground line 186 is connected to the bottom ends of SPDs 250A and 250B.

Figure 13C:
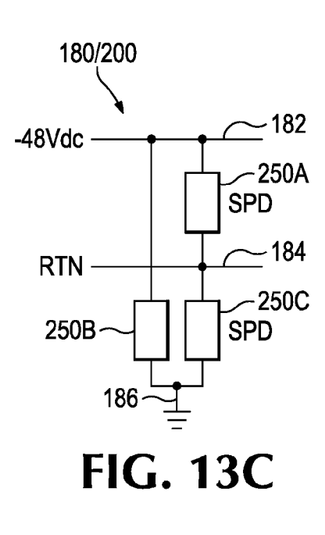

FIG. 13C depicts another example connection configuration for surge protection system 180 or 200. In this example, −48 VDC power line 182 is connected to the top end of SPD 250A and a top end of SPD 250B. Return power line 184 is connected to both a bottom end of SPD 250A and a top end of a SPD 250C. Ground line 186 is connected to the bottom ends of SPD 250B and 250C.

Figure 13D:
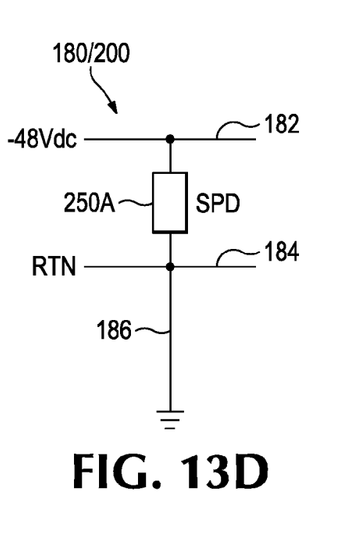

FIG. 13D is a schematic diagram showing a single SPD configuration for surge protection system configuration 180 or 200. In this example, −48 VDC power line 182 is connected to the top end of SPD 250A and return power line 184 is connected to a bottom end of SPD 250A. Ground line 186 is also connected to the bottom end of SPD 250A.

Several preferred examples have been described above with reference to the accompanying drawings and pictures. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A cable breakout assembly, comprising:
a breakout device including an enclosure located on a cellular telecommunication tower and configured to receive a primary power cable and connect one power line in the primary power cable with multiple secondary power lines in multiple secondary power cables;
an internal power distribution terminal located within the enclosure to electrically connect together the one primary power line in the primary power cable with the multiple secondary power lines in the multiple secondary power cables; and
a surge protection system located within the breakout device enclosure and connected between the power line in the primary power cable and the internal power distribution terminal that connects together the secondary power lines in the secondary power cables, wherein:
the primary power cable is connected between the breakout device enclosure and a base transceiver station (BTS); and
the secondary power cables are connected between the breakout device and remote radio units (RRUs) on the cellular telecommunication tower.

2. The cable breakout assembly of claim 1, further comprising a second internal power distribution terminal in the enclosure to electrically connect together multiple primary power lines from the primary power cable to the internal power distribution terminal, wherein the surge protection system is connected between the second internal power distribution terminal and the internal power distribution terminal.

3. The cable breakout assembly of claim 1, further comprising a second power distribution terminal to electrically connect together one return power line in the primary power cable together with multiple return power lines in the secondary power cables.

4. The cable breakout assembly of claim 3, further comprising a third power distribution terminal electrically connecting together multiple ones of the primary power lines in the primary power cable with the internal power distribution terminal.

5. The cable breakout assembly of claim 4, further comprising a fourth power distribution terminal electrically connecting together multiple return power lines in the primary power cable with the second power distribution terminal.

6. The cable breakout assembly of claim 1, further comprising multiple surge protection systems located within the breakout device each connected to a separate pair of the primary power lines in the primary power cable and connected to a separate pair of the secondary power lines in one of the secondary power cables.

7. The cable breakout assembly of claim 1, wherein the surge protection system comprises:
a first surge protection unit coupled to a first one of the primary power lines and a first one of the secondary power lines; and
a second surge protection unit coupled to a second one of the primary power lines or ground, and connected to a second one of the secondary power lines or ground.

8. A surge protection system, comprising:
an enclosure to attach on a cellular telecommunication tower in-between a first section of a power cable and a second section of a power cable;
a breakout device located in the enclosure including a power distribution terminal coupled to a first one of multiple power lines in the first section of the power cable and electrically connecting together the first one of the multiple power lines with multiple ones of second power lines in the second section of the power cable; and
a surge protection system located within the enclosure including one or more surge protection devices connected in-between the first one of the multiple power lines in the first section of the power cable and the power distribution terminal.

9. The surge protection system of claim 8, wherein the first section of the power cable is configured to connect to the breakout device and the second section of the power cable is configured to connect to a remote radio unit.

10. The surge protection system of claim 8, wherein the second section of the power cable comprises a jumper power cable configured to connect to the breakout device.

11. The surge protection system of claim 10, wherein:
a first section of the jumper power cable is coupled via a first connector to the breakout device; and
a second section of the jumper power cable is coupled via a second connector to a remote radio unit (RRU).

12. The surge protection system of claim 8, wherein the breakout device includes an additional power distribution terminal to electrically connect a second one of the multiple power lines in the first section of the power cable with a second set of multiple ones of the second power lines in the secondary power cables.

13. The surge protection system of claim 8, wherein:
−48 VDC power lines in the first and second sections of the power cable are each connected to a first one of the surge protection devices; and
return power lines in the first and second sections of the power cable are each connected to a second one of the surge protection devices.

14. The surge protection system of claim 13, wherein ground lines in the first and second sections of the power cable are connected to one or more of the first and/or second one of the surge protection devices.

15. A surge protection system, comprising:
a breakout device located on a cellular telecommunication tower;
multiple different first pairs of power lines from a primary cable connected to the breakout device;
multiple different second pairs of power lines in multiple secondary cables connected at first ends to remote radio units (RRUs) on the cellular communication tower and connected at second ends inside of the breakout device to associated first pairs of power lines pairs from the primary cable; and
multiple surge protection devices located in the breakout device and each connected in-between a different set of the first pairs of power lines and the second pairs of power lines.

16. The surge protection system of claim 15, further comprising
a first bus bar coupling a first one of the first pairs of power lines and a first one of the second pairs of power lines to a first one of the surge protection devices in the breakout device;
a second bus bar coupling a second one of the first pairs of power lines and a second one of the second pairs of power lines in between the first one of the surge protection devices and a second one of the surge protection devices in the breakout device; and
a third bus bar coupling a ground line to the second one of the surge protection devices.

17. The surge protection system of claim 15, wherein:
at least one of the surge protection devices is configured to connect to a first power distribution terminal; and
the first power distribution terminal is configured to electrically connect together one of the power lines from the primary cable to multiple ones of the power lines in the secondary cables.

18. The surge protection system of claim 15, further comprising one or more of the surge protection devices connected in a base transceiver station (BTS) to an opposite end of the power lines from the primary cable.

19. The surge protection system of claim 15, wherein:
the primary cable is connected between the breakout device and a base transceiver station (BTS); and
the secondary cables are connected between the breakout device and the RRUs on the cellular telecommunication tower.

* * * * *